(12) United States Patent
Pruitt et al.

(10) Patent No.: US 11,010,537 B2
(45) Date of Patent: *May 18, 2021

(54) WEB-INTRINSIC INTERACTIVE DOCUMENTS

(71) Applicant: Open Text Corporation, Waterloo (CA)

(72) Inventors: Byron S. Pruitt, Lexington, KY (US); Anthony Wiley, Lexington, KY (US)

(73) Assignee: Open Text Corporation, Waterloo (CA)

( * ) Notice: Subject to any disclaimer, the term of this patent is extended or adjusted under 35 U.S.C. 154(b) by 19 days.

This patent is subject to a terminal disclaimer.

(21) Appl. No.: 16/255,080

(22) Filed: Jan. 23, 2019

(65) Prior Publication Data

US 2019/0171696 A1    Jun. 6, 2019

Related U.S. Application Data (63) Continuation of application No. 15/503,962, filed as application No. PCT/US2014/051206 on Aug. 15, 2014, now Pat. No. 10,223,339.

(51) Int. Cl.
| | |
|---|---|
| *G06F 40/14* | (2020.01) |
| *G06F 16/93* | (2019.01) |
| *G06F 16/958* | (2019.01) |
| *G06F 40/186* | (2020.01) |
| *G06F 8/34* | (2018.01) |
| *H04L 29/08* | (2006.01) |
| *G06Q 10/10* | (2012.01) |
| *G06F 8/38* | (2018.01) |
| *G06F 17/00* | (2019.01) |

(52) U.S. Cl.
CPC ............ *G06F 40/14* (2020.01); *G06F 16/93* (2019.01); *G06F 16/986* (2019.01); *G06F 40/186* (2020.01); *G06F 8/34* (2013.01); *G06F 8/38* (2013.01); *G06F 16/958* (2019.01); *G06Q 10/10* (2013.01); *H04L 67/1095* (2013.01)

(58) Field of Classification Search
CPC .......... G06F 17/3089; G06F 8/34; G06F 8/38; G06F 40/14; G06F 40/186; G06F 16/93; G06F 16/986; G06F 16/958; H04L 67/1095; G06Q 10/10
See application file for complete search history.

(56) References Cited

U.S. PATENT DOCUMENTS 7,000,184 B2    2/2006    Matveyenko et al.
8,281,288 B1    10/2012   Spencer
(Continued)

OTHER PUBLICATIONS

International Search Report and Written Opinion issued for PCT Application No. PCT/US2014/051206, dated Mar. 31, 2015, 11 pages.

(Continued)

*Primary Examiner* — Quoc A Tran
(74) *Attorney, Agent, or Firm* — Sprinkle IP Law Group (57) ABSTRACT

A system for providing interactive documents as a web service is described. The system includes a content repository for storing an interactive document in a web-intrinsic container. The interactive document includes a document editor that is a native web browser application. The system also includes a web server to deliver the interactive document to a client computer through a network, receive Hypertext Transfer Protocol (HTTP) requests from a web browser of the client computer, and updates the interactive document based on the HTTP requests.

18 Claims, 6 Drawing Sheets

(56) References Cited

U.S. PATENT DOCUMENTS

| | | |
|---|---|---|
| 8,296,392 B2 | 10/2012 | Green et al. |
| 1,022,333 A1 | 3/2019 | Pruitt et al. |
| 2003/0023632 A1* | 1/2003 | Ries ..................... G06F 16/958 715/235 |
| 2005/0102612 A1 | 5/2005 | Allan et al. |
| 2009/0006996 A1* | 1/2009 | Saha ................... G06F 21/6218 715/765 |
| 2010/0251143 A1* | 9/2010 | Thomas ............... G06F 16/958 715/760 |
| 2010/0332973 A1* | 12/2010 | Kloiber ................. G06F 40/14 715/255 |
| 2012/0284609 A1 | 11/2012 | Marmor |
| 2016/0041954 A1* | 2/2016 | Bloch ................... G06F 16/986 715/234 |
| 2017/0270083 A1 | 9/2017 | Pruitt et al. |

OTHER PUBLICATIONS

International Preliminary Report on Patentability (IPRP) issued for PCT Application No. PCT/US2014/051206, dated Feb. 21, 2017, 9 pages.

Office Action issued for U.S. Appl. No. 15/503,962, dated Feb. 26, 2018, 21 pages.

Notice of Allowance issued for U.S. Appl. No. 15/503,962, dated Oct. 23, 2018, 18 pages.

* cited by examiner

WEB-INTRINSIC INTERACTIVE DOCUMENTS

CROSS-REFERENCE TO RELATED APPLICATION(S)

This application is a continuation of, and claims a benefit of priority under 35 U.S.C. § 120 of the filing date of U.S. patent application Ser. No. 15/503,962, filed Feb. 14, 2017, issued as U.S. Pat. No. 10,223,339, entitled "WEB-INTRINSIC INTERACTIVE DOCUMENTS," which is a 35 U.S.C. § 371 national stage application of International Application No. PCT/US2014/051206 filed Aug. 15, 2014, entitled "WEB-INTRINSIC INTERACTIVE DOCUMENTS." All applications referenced in this paragraph are fully incorporated by reference herein for all purposes.

BACKGROUND

Interactive documents are complex applications that give the user the visual editing experience of editing a document as it also looks in its printed form. Sections of the document can be read-only while others are editable, enabling the user to dynamically conform artifacts, such as images, to specific users. Interactive documents are often used in enterprises to enable agents of the enterprise to quickly and easily create standardized and visually appealing documents that can be used for customer interactions. For example, agents of an enterprise such as a financial services company may use an interactive document to generate account statements, responses to customer inquiries, personalized offers, advertisements, and the like.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The present disclosure provides techniques for providing interactive documents as a Web service such that the interactive document is editable through a standard Web-browser without the use of a Web browser plug-in. As used herein, the term "document" refers to an electronic file that contains informational content to be communicated to a person as well as data specifying how the informational content is to be visually displayed. Some examples of documents are financial statements, customer communications, legal documents, contracts, advertisements, and purchase receipts, among others.

An "interactive document editor" is a software application that enables a user to generate and edit the interactive document. Interactive document editors are usually developed using proprietary formats that are not compatible with Web browser implementations because they were originally intended as desk-top applications. These formats were not designed for compatibility with the underlying Web architecture. As a consequence, deploying an interactive document editor as a Web service usually involves the use of a Web browser plug-in, which is a special application used to view and edit the interactive document. A Web browser plug-in is a compiled software application that can be launched by a web browser to add a specific feature to the Web browser but contains programming instructions that cannot be processed by the Web browser itself.

The present disclosure provides a system for providing an interactive document editor as a native Web browser application. A native Web browser application is an application that is written in programming instructions that can be processed by a standard Web browser without any additional software such as a plug-in. One example of a programming language with programming instructions can be processed by a standard Web browser is JavaScript. The interactive document editor described herein provides a higher quality editing experience because the editor's look and feel is consistent with the web browser's innate controls and navigation. Furthermore, the interactive document editor described herein does not use a Web-browser plug-in to operate.

Figure 1:
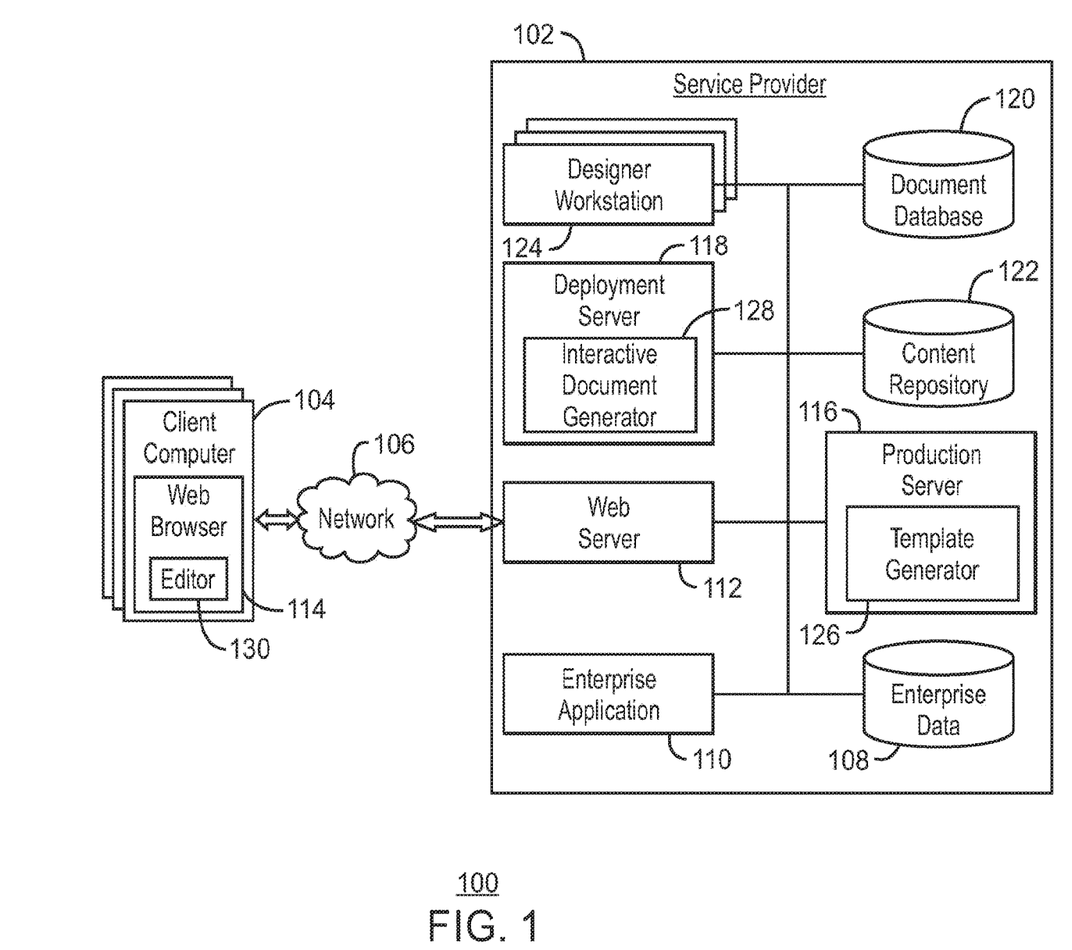
FIG. 1 is an example block diagram of a computer system for generating interactive documents.

FIG. 1 is an example block diagram of a computer system for generating interactive documents. It will be appreciated that the computer system 100 shown in FIG. 1 is only one example of a computer system in accordance with embodiments. In an actual implementation, the computer system 100 may include various additional storage devices and networks, which may be interconnected in any suitable fashion, depending on the design considerations of a particular implementation. For example, a large computer system will often have many more client computers and storage devices than shown in this illustration.

In some examples, the computer system 100 includes a service provider 102 that can provide data storage, processing, and software resources to any number of client computers 104, which may be general purpose computers, workstations, mobile computing devices, and the like. In some examples, the client computers 104 are operated by agents of an enterprise, such as customer service representatives of a business, or agents of a government agency, for example. The client computers 104 can be coupled to the service provider 102 through network 106, which may be any suitable type of network 106, including a local area network (LAN), a Wide Area Network (WAN), or the Internet, for example.

In some examples, the service provider 102 stores and maintains enterprise data 108 and enterprise applications 110 as a Web service provided to the client computers 104. The enterprise applications 110 include specialized software that can be used to serve a specific purpose within an enterprise, such as document archiving, management of customer data, and workflow processing, billing and accounting applications, among others. Enterprise data includes data belonging to the enterprise, such as customer data, financial information, billing records, and product information, among others. Enterprise applications 110 and data 108 may be delivered to client computers 104 through a Web server 112. Each client computer can include a Web browser 114 that enables it to communicate with the Web server 112. Although the enterprise applications 110 and enterprise data 108 are shown as being provided as a Web service, it will be appreciated that some or all of the enterprise applications 110 and enterprise data 108 could also be stored on within a data center of the enterprise, which can be accessed by the client computers 114 through a local network connection rather than through the Internet.

The service provider 102 also includes various components configured to provide interactive documents to the client computers 104, including a production server 116, deployment server 118, document database 120, and content repository 122. Interactive documents are generated by designers at designer workstations 124, which may be general purpose computers, workstations, mobile computing devices, and the like.

The document designer produces the document's design template form using a software application referred to herein as the template generator 126. The design template may be created to serve some specialized purpose within the enterprise, such as customer communications. For example, the design template may be a template to be used for notifying a customer that a billing statement is available. The design template is an abstract description for how the document should appear. The document template describes the overall layout of the interactive document and determines which parts of the document will contain static information, such as standardized text, which parts of the document will be filled according to business rules, and which parts of the document can be edited by the user. The design template may also include some pre-determined content, such as text, business logos, and the like. The content and layout of the design template may be in accordance with specifications provided by the enterprise.

Each interactive document is stored in the form of a document container, which is a pre-defined set of files that provides an atomic unit and enables documents to be processed by enterprise applications 110, such as archiving and workflow applications. In some examples, the container is a set of files that uses the Open Package Convention (OPC) specification to define the structure and content of the interactive document. The OPC specification defines a set of files for describing the content types in the file and the relationships between the content parts. Other container formats could also be used to define the interactive document, including the Zip file format or a set of proprietary description files.

The production server 116 translates the document's abstract design description provided by the designer into the interactive document container, by translating the abstract description into a specific document layout. This translation process includes translating the abstract design into specific HTML tags and CSS directives, which are included in the document container. The combination of tag type semantics and CSS style directives creates a document that is an accurate representation of the documents design in a web-intrinsic form. In addition, the interactive functions specified in the abstract design are translated to JavaScript and included in the document container. Support files containing custom data are included in the document container and written in a format such as JavaScript Object Notation (JSON), for example. The production server 116 stores the document container to a document database 120 as a pre-deployment cache referred to herein as a document template. The document container is described in more detail in relation to FIG. 2.

In the event that a client requests an interactive document, the document deployment server 118 retrieves the document template from the document database 120 and generates an interactive document. The operations of the deployment server 118 may be directed by software referred to herein as the interactive document generator 128. In some examples, the content document deployment server 118 populates the interactive document with content from the enterprise data 108 based on information received from the client computer 104. Population of the interactive document can be accomplished using a rules engine, which is a set of JavaScript functions that when evaluated can perform a set of actions that typically set the value of variables, or can control whether sections of a document are revealed or hidden. The rules engine dynamically evaluates these JavaScript functions. A specific JavaScript function can test the value of a variable and depending on the function value can set the value of other variables. For example, these variables can represent simple values like a monetary value or a special value which triggers whether a HTML tag is shown.

For example, the document request may include one or more identifiers that identify the type of document being requested and other information that can be used to identify content to be included in the interactive document. For example, the document request can include a customer identifier and a client identifier. Using the customer identifier, the document deployment server can retrieve information about the customer from the enterprise data 108, such as the customer's name, account number, address, and the like. Using the client identifier, the document deployment server 118 can retrieve information about the client from the enterprise data 108, such as a client logo, for example. The document can be populated with the retrieved information in accordance with specifications of the design template. The document deployment server 118 also deploys the populated document to the document content repository 122 in a structure that is conducive to web interaction.

Once the interactive document is deployed, it can be accessed by the client computer 104 through the Web browser 114 by addressing the document according to a Uniform Resource Locator (URL) assigned to the interactive document. The Web server 112 can send the interactive document to the client computer. The Web server 112 responds to requests from the Web browser 114 of the client computer 104 for each document content component. Each document component is addressable via a Uniform Resource Locator (URL) that uniquely identifies each component of the document. The interactive document container includes a document editor 130 that is sent to the client computer 104 and enables the interactive document to be edited. The editor 130 is an application developed in a form native to the client computer's Web browser 114 and functions through Hypertext Transfer Protocol (HTTP) requests, such as GET, POST, PUT, and DELETE.

The user can edit the interactive document by interacting with document editor 130 which is implemented in the Web browser 114. For example, the user may be able to add text to certain components of the document that are designated for receiving user text, and add images to certain components of the document that are designated for receiving user specified images. Changes to the document are implemented through the HTTP methods and stored to the content repository 122. When the user is finished editing the document, the document may be placed into a workflow managed by an enterprise application 110. For example, the document may be sent to a designated customer and then stored to a document archive as a record of the customer transaction. The finished document may be stored in a Web-intrinsic form that includes a number of files, such as HTML files, JavaScript files, CSS files, and JavaScript Object Notation (JSON), among others. The document container provides an atomic unit for the enterprise applications 110.

Figure 2:
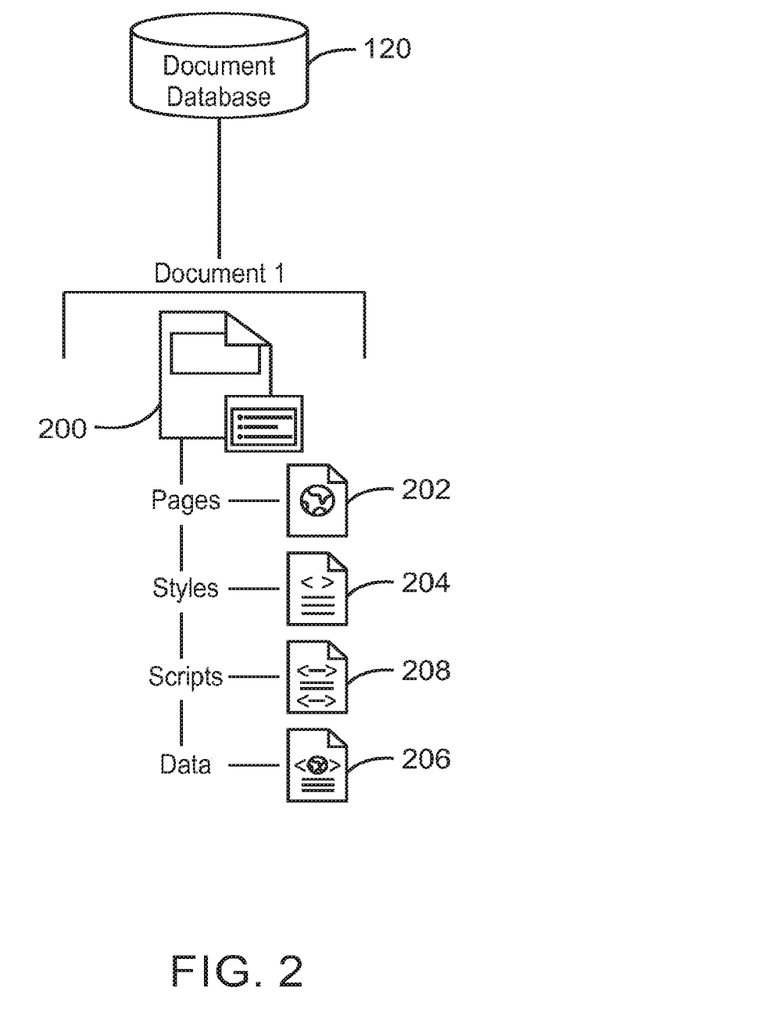
FIG. 2 is a block diagram of an example of an interactive document 200 stored to the document database.

FIG. 2 is a block diagram of an example of an interactive document 200 stored to the document database 120. As shown in FIG. 2, each interactive document 200 can include a plurality of Web pages 202, which may be written in HyperText Markup Language (HTML), eXtensible (XHTML), or any other suitable markup language. Each Web page 202 may be associated with a corresponding style sheet 204 for describing the look and format of the corresponding Web page 202. The style sheets 204 may be written in any suitable style sheet language, including Cascading Style Sheets (CSS) among others. The interactive document 200 may also include one or more data sheets 206, which contain substantive data that can be visually presented in the interactive document. The position, format, and style of the data can be determined by the style sheets 204.

Figure 3:
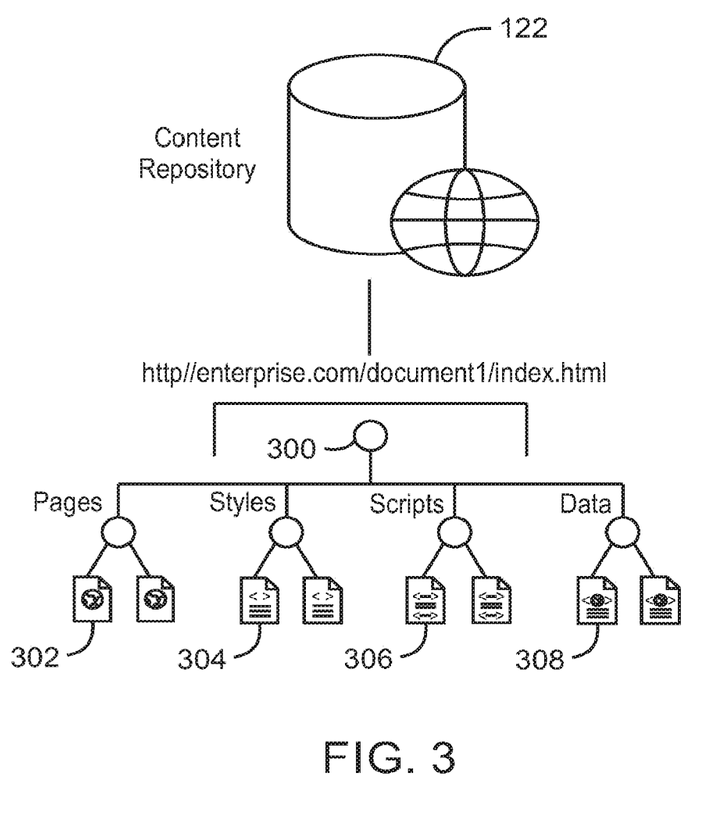
FIG. 3 is a block diagram of an example of an interactive document stored to the content repository.

The interactive document may also include one or more programming scripts 208 that can control the behavior of one or more components of the various Web pages. The programming scripts 208 may be written in any Webintrinsic programming language, such as JavaScript. The document editor 130 may be included in the document 200 as one or more of the programming scripts. For example, programming scripts that make up the document editor 130 may control the behavior of various data entry or selection components, such as text boxes, dropdown lists, and the like. The interactive document content is organized in the container in a file grouping for a direct replication in a content repository. In effect, the document 200 mirrors a web site and is directly accessible by the Web browser 114. FIG. 3 illustrates how the Web-intrinsic interactive document could be stored in a content repository 122.

FIG. 3 is a block diagram of an example of an interactive document stored to the content repository 122. As explained above, the document deployment server 118 retrieves the document template 200 from the document database 120, creates the interactive document from the document template, and stores the interactive document in the content repository 122 in a structure that is conducive to web interaction. For example, the content repository may be a database that stores content in a hierarchical parent-child form that closely matches the form of a Website. The components of the interactive document included in the container file map naturally to the content repository. The document may be addressed by the Web browser 114 of the client computer 104 through a URL that identifies a root Web resource. The root resource 300 can contain links to additional resources, including additional sub-pages 302, style sheets 304, programming scripts 306, and data 308. Each of the additional resources can also be identified by a URLs or a Uniform Resource Identifier (URI).

During user interaction with the document, the pages 302 and data 306 can be edited by the Web browser 114 using HTTP methods, such as GET, POST, PUT, and DELETE. Editing the pages 302 and data 308 enables the user to conform the document into a customized document to be presented to another party, such as a customer of the enterprise. When the user is finished editing the interactive document, the finished document can be entered into a workflow managed by an enterprise application 110. For example, the finished document can be scheduled to be sent to the customer and archived and/or entered into a document review and approval workflow. Additionally, one or more enterprise applications 110 can be given access to the finished document and allowed to retrieve specific values from the file for auditing and/or report generation.

Figure 4:
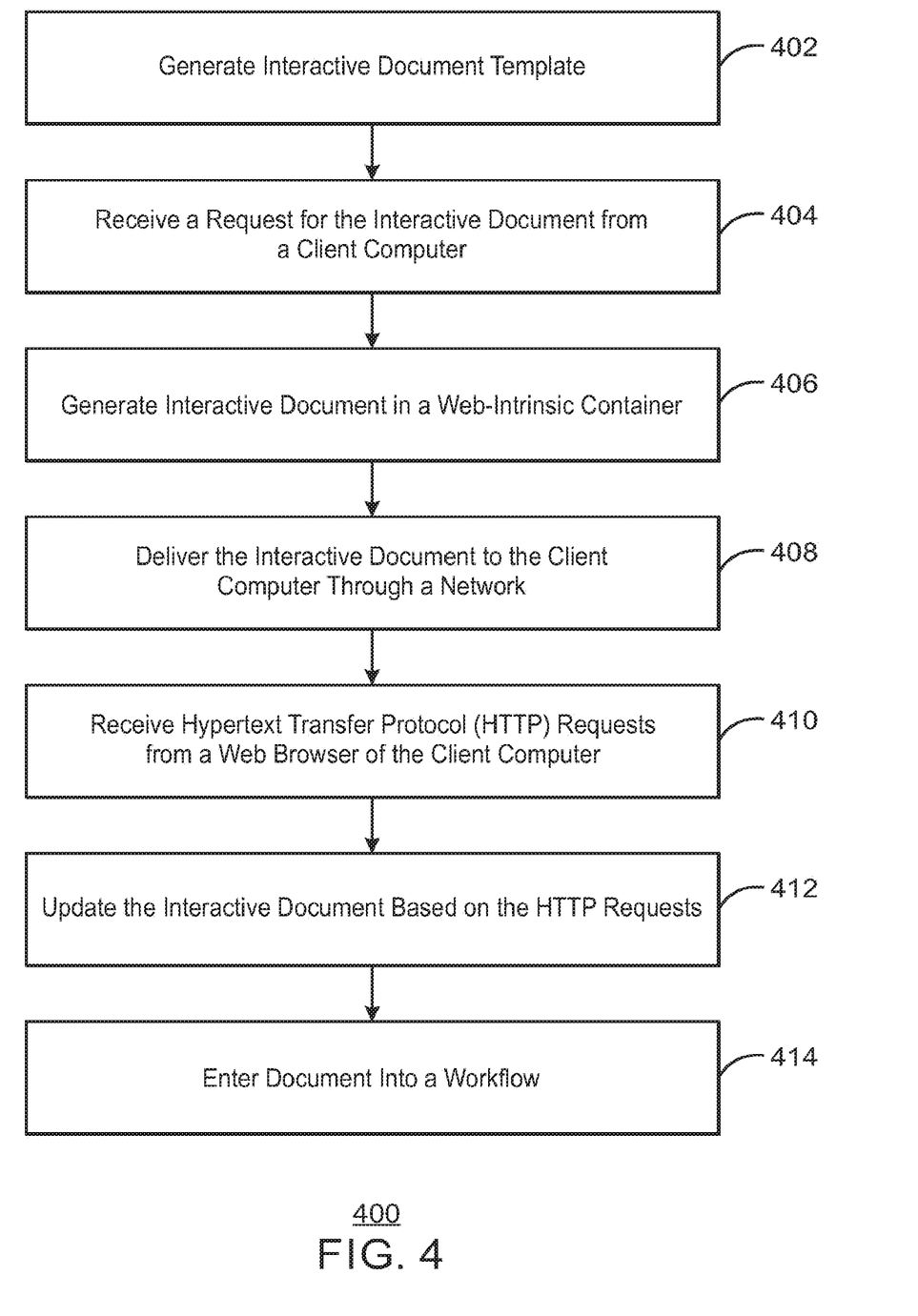
FIG. 4 is an example process flow diagram of a method of generating an interactive document.

FIG. 4 is an example process flow diagram of a method of generating an interactive document. The method 400 can be performed by one or more computing devices such as the components of the service provider 102 shown in FIG. 1.

At block 402, an interactive document template is generated. The document template may be generated by designers in accordance with content and layout specifications provided by a client. The document template is described in more detail above in relation to FIG. 1. The document template may be stored to a document database as a pre-deployment cache.

At block 404, a request is received from a client computer 104 for the interactive document template. The request may be received by the Web server 112. The request can identify a particular type of interactive document as well as additional information that can be used to populate one or more fields of the interactive document.

At block 406, interactive document is generated in a Web-intrinsic container. During this process, the identified document template can be retrieved from the document database, and the interactive document can be generated using the document template. The interactive document can be stored to the content repository 122 in a structure that is conducive to web interaction and fields of the interactive document can be edited based on the additional information received with the request. For example, if the additional information is a customer identifier, information about the customer such as name, address, account number, account information, and the like, can be included in the interactive document in a manner specified by the document template. The Web server 112 can also assign a URL to the interactive document that enables the Web browser 114 of the client computer 104 to access the interactive document.

At block 408, the Web server 112 delivers the interactive document to the client computer through a network 106 such as the Internet. The URL assigned to the interactive document can be communicated to the Web browser 114 through the network 106, and the Web browser 114 can access the interactive document through an HTML request.

At block 410, the Web server 112 receives HTTP requests from the client's Web browser 114 through the network. The HTTP requests represent editing operations requested by the client.

At block 412, the Web server 112 updates the interactive document by processing the HTTP requests. The HTTP requests may be generated and sent by an editor that is included in interactive document container. The programming instructions that make up the editor can be processed by the Web browser 114, meaning that no browser plug-in is needed to edit the interactive document.

At block 414, the finished document can entered to a work flow. For example, the finished document can be sent to a customer and archived.

The process flow diagram of FIG. 4 is not intended to indicate that the elements of method 400 are to be executed in any particular order, or that all of the elements of the method 400 are to be included in every case. Further, any number of additional elements not shown in FIG. 4 can be included in the method 200, depending on the details of the specific implementation.

Figure 5:
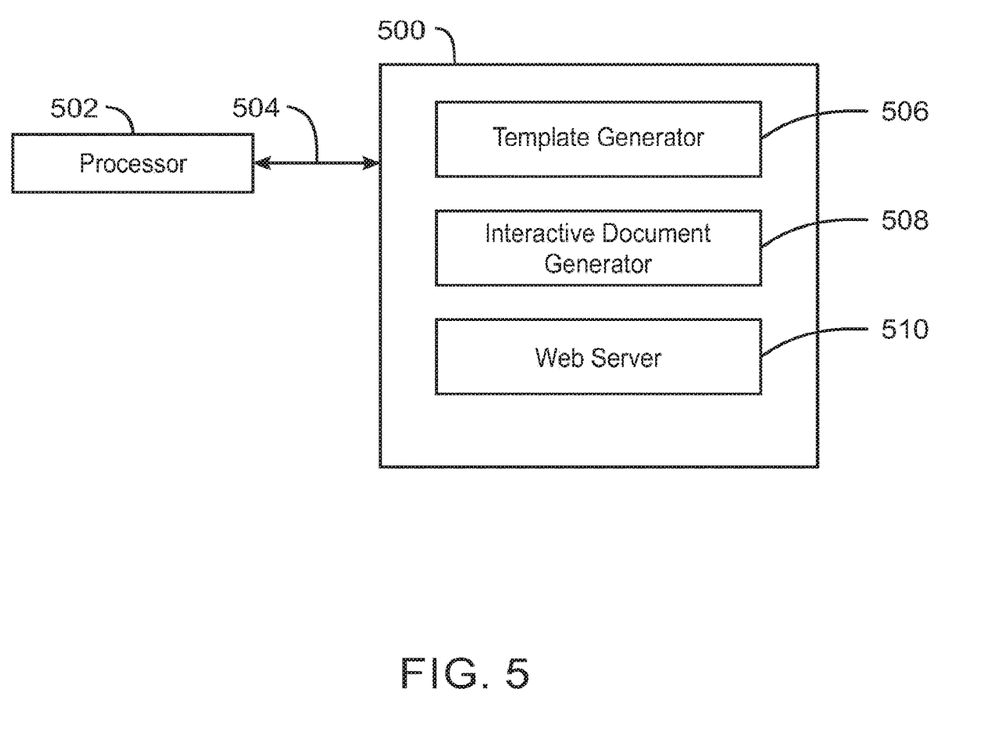
FIG. 5 is an example block diagram showing a tangible, non-transitory, computer-readable medium that stores code configured to generate interactive documents.

FIG. 5 is an example block diagram showing a tangible, non-transitory, computer-readable medium that stores code configured to generate interactive documents. The computer-readable medium is referred to by the reference number 500. The computer-readable medium 500 can include RAM, a hard disk drive, an array of hard disk drives, an optical drive, an array of optical drives, a non-volatile memory, a flash drive, a digital versatile disk (DVD), or a compact disk (CD), among others. The computer-readable medium 500 may be accessed by a processor 502 over a computer bus 504. Furthermore, the computer-readable medium 500 may include instructions configured to direct one or more processors to perform the methods described herein. For example, the computer-readable medium 500 may include software and/or firmware that can be executed by components of the service provider 102 of FIG. 1, including the deployment server 118, the production server 116, and the Web server 112.

A region 506 can include a template generator that enables a designer to create a document template and generate the container for the interactive document.

A region 508 can include an interactive document generator configured to retrieve a document template from the document database 120 in response to a user request, populate the interactive document with information included in the request from the user, and store the interactive document in a form that facilitates Web interaction. The interactive document also includes an editor, which is a native Web browser application.

A region 510 can include a Web server configured to deliver the interactive document to a user, and receive editing commands from the user. The editing commands may be in the form of HTTP requests, which may be received from the document editor residing on the client computer 104 and processed by the client computer's Web browser 114.

Although shown as contiguous blocks, the programming code components can be stored in any order or configuration. For example, if the tangible, non-transitory, computer-readable medium is a hard drive, the software components can be stored in non-contiguous, or even overlapping, sectors.

Figure 6:
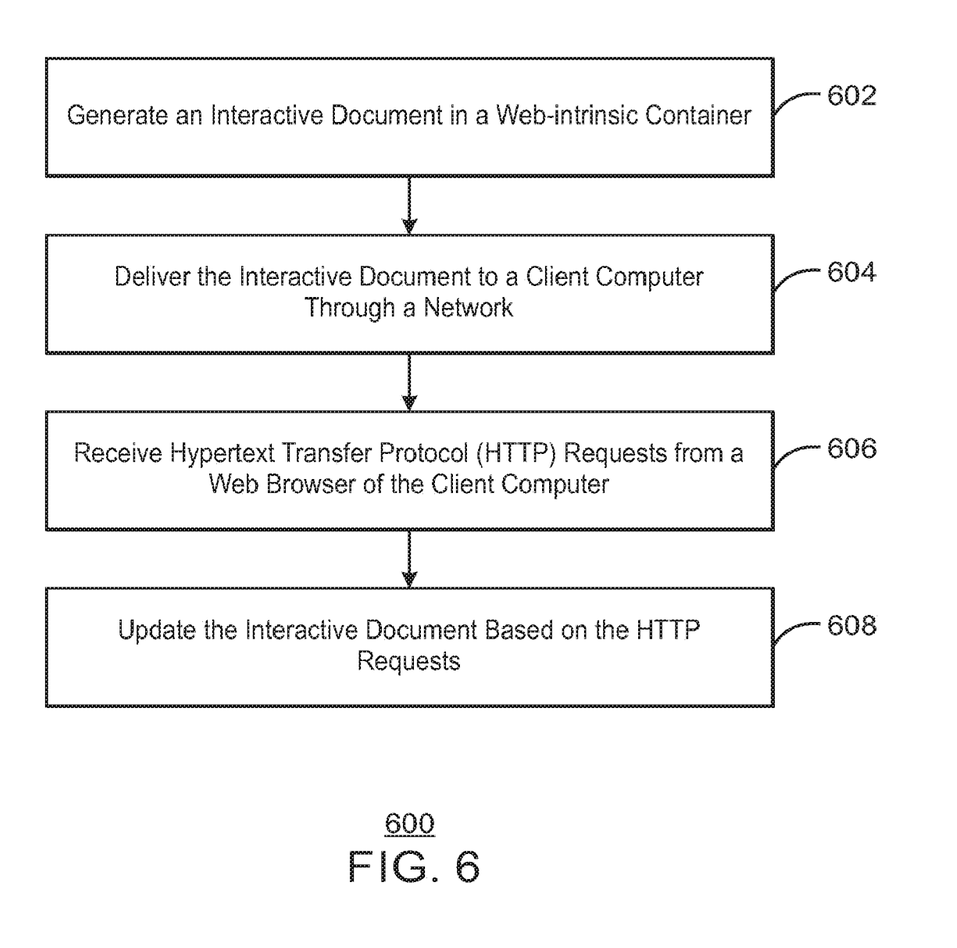
FIG. 6 is an example process flow diagram summarizing a method of generating an interactive document.

FIG. 6 is an example process flow diagram summarizing a method of generating an interactive document. The method 600 can be performed by one or more computing devices such as the components of the service provider 102 shown in FIG. 1.

At block 602, an interactive document in generated in a Web-intrinsic container. In some examples, the interactive document is generated from a document template based on a request for the document from a client.

At block 604, the interactive document is delivered to a client computer through a network. The interactive document may be delivered by a Web server to a Web browser of a client computer through the Internet. The structure and content of the interactive document makes it simple to deliver the interactive document as a Web service. For example, the interactive document includes an editor that implemented in a standard Web browser without the use of a plug-in.

At block 606 Hypertext Transfer Protocol (HTTP) requests are received from a Web browser of the client computer. The HTTP requests can be generated by the Web browser in accordance with the programming instructions of the editor. The HTTP requests may be generated in response to editing operation of the client as the client customized the interactive document.

At block 608, the interactive document is updated based on the HTTP requests. For example, data of the interactive document can set to a value provided by the client.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A system for providing interactive documents as a Web service, comprising:
    a content repository for storing a Web-intrinsic container, the Web-intrinsic container including an interactive document and a document editor that is a native Web browser application, wherein the interactive document includes programming scripts, and wherein the programming scripts comprise the document editor which is configured to control the behavior of data entry and selection components for editing the interactive document, and wherein the interactive document is based on a document template that describes a layout of the interactive document and determines portions of the interactive document that can be edited by a user via the document editor;
    a Web server to deliver the Web-intrinsic container, including the interactive document and the document editor to a client computer through a network, receive Hypertext Transfer Protocol (HTTP) requests from a Web browser of the client computer relating to desired edits to one or more of the editable portions of the interactive document initiated by the user via the document editor included with the interactive document in the Web-intrinsic container, and update the interactive document based on the HTTP requests.

2. The system of claim 1, comprising a production server configured to enable a designer to generate the document template and store the document template to a document database.

3. The system of claim 2, comprising a deployment server configured to, in response to a user request for the interactive document:
    retrieve the document template from the document database;
    assign a Uniform Resource Locator (URL) to a root resource of the interactive document; and
    store the interactive document to the content repository.

4. The system of claim 3, wherein the deployment server populates the interactive document with enterprise data based on information received with the user request for the interactive document.

5. The system of claim 1, comprising an enterprise application, wherein the interactive document is entered into a workflow managed by the enterprise application after the user is done editing the interactive document.

6. The system of claim 1, wherein the document editor can be processed by the Web browser of the client computer without using a Web browser plug-in.

7. A method of generating an interactive document, comprising:
    generating a Web-intrinsic container, the Web-intrinsic container including an interactive document and a document editor that is a native Web browser application, wherein the interactive document includes programming scripts, and wherein the programming scripts comprise the document editor which is configured to control the behavior of data entry and selection components for editing the interactive document, and wherein the interactive document is based on a document template that describes a layout of the interactive document and determines portions of the interactive document that can be edited by a user;

delivering the Web-intrinsic container, including the interactive document and the document editor to a client computer through a network;

receiving Hypertext Transfer Protocol (HTTP) requests from a Web browser of the client computer relating to desired edits to one or more of the editable portions of the interactive document initiated by the user via the document editor included with the interactive document in the Web-intrinsic container; and updating the interactive document based on the HTTP requests.

8. The system of claim 7, generating the document template and storing the document template to a document database.

9. The system of claim 8, comprising, in response to a user request for the interactive document:

retrieving the document template from the document database and generating the interactive document from the document template;

assigning a Uniform Resource Locator (URL) to a root resource of the interactive document; and storing the interactive document to the content repository.

10. The system of claim 9, comprising, in response to a user request for the interactive document, populating the interactive document with enterprise data based on information received with the user request for the interactive document.

11. The system of claim 7, comprising entering the interactive document into a workflow managed by an enterprise application after the user is done editing the interactive document.

12. The method of claim 7, wherein the document editor can be processed by the Web browser of the client computer without using a Web browser plug-in.

13. A tangible, non-transitory, computer-readable medium comprising instructions that direct one or more processors to:

generate a Web-intrinsic container, the Web-intrinsic container including an interactive document and a document editor that is a native Web browser application, wherein the interactive document includes programming scripts, and wherein the programming scripts comprise the document editor which is configured to control the behavior of data entry and selection components for editing the interactive document, and wherein the interactive document is based on a document template that describes a layout of the interactive document and determines portions of the interactive document that can be edited by a user;

deliver the Web-intrinsic container, including the interactive document and the document editor to a client computer through a network;

receive Hypertext Transfer Protocol (HTTP) requests from a Web browser of the client computer relating to desired edits to one or more of the editable portions of the interactive document initiated by the user via the document editor included with the interactive document in the Web-intrinsic container; and update the interactive document based on the HTTP requests.

14. The computer-readable medium of claim 13, comprising instructions that direct the one or more processors to generate the document template and store the document template to a document database.

15. The computer-readable medium of claim 14, comprising instructions that direct the one or more processors to, in response to a user request for the interactive document:

retrieve the document template from the document database and generate the interactive document from the document template;

assign a Uniform Resource Locator (URL) to a root resource of the interactive document; and store the interactive document to the content repository.

16. The computer-readable medium of claim 13, comprising instructions that direct the one or more processors to, in response to a user request for the interactive document, populate the interactive document with enterprise data based on information received with the user request for the interactive document.

17. The computer-readable medium of claim 13, comprising instructions that direct the one or more processors to enter the interactive document into a workflow managed by an enterprise application after the user is done editing the interactive document.

18. The tangible, non-transitory, computer-readable medium of claim 13, wherein the document editor can be processed by the Web browser of the client computer without using a Web browser plug-in.

\* \* \* \* \*